(12) United States Patent
Bukosky et al.

(10) Patent No.: US 6,918,685 B2
(45) Date of Patent: Jul. 19, 2005

(54) MIRROR WITH INTEGRATED SIGNALING ASSEMBLY

(75) Inventors: Allen A. Bukosky, Sheboygan, WI (US); Daniel J. Mathieu, Sheboygan Falls, WI (US)

(73) Assignee: K. W. Muth Company, Inc., Sheboygan, WI (US)

( * ) Notice: Subject to any disclaimer, the term of this patent is extended or adjusted under 35 U.S.C. 154(b) by 207 days.

(21) Appl. No.: 10/124,213

(22) Filed: Apr. 15, 2002

(65) Prior Publication Data

US 2003/0193814 A1 Oct. 16, 2003

(51) Int. Cl.[7] ............................................... B60Q 1/24
(52) U.S. Cl. ........................ 362/301; 362/298; 362/341; 362/494; 362/540
(58) Field of Search ............................ 362/3, 5, 16, 18, 362/28, 29, 30, 459, 487, 494, 509, 510, 516, 519, 523–525, 529–532, 540, 546, 135, 269, 138–141, 271, 301, 296–298, 317, 341, 342, 355, 257, 300

(56) References Cited

U.S. PATENT DOCUMENTS

| | | | |
|---|---|---|---|
| 2,580,014 A | * 12/1951 | Gazda ........................ 362/494 |
| 2,595,331 A | * 5/1952 | Calihan et al. ............. 362/494 |
| 3,266,016 A | 8/1966 | Maruyama et al. ......... 362/494 |
| 4,791,534 A | * 12/1988 | Lindberg ..................... 362/516 |
| 5,014,167 A | 5/1991 | Roberts ....................... 362/494 |
| 5,059,015 A | 10/1991 | Tran ............................ 359/844 |
| 5,207,492 A | 5/1993 | Roberts ........................ 362/30 |
| 5,355,284 A | 10/1994 | Roberts ........................ 362/30 |
| 5,361,190 A | 11/1994 | Roberts et al. ............. 362/464 |
| 5,371,659 A | 12/1994 | Pastrick et al. ............. 362/494 |
| 5,402,103 A | 3/1995 | Tashiro ........................ 340/475 |
| 5,436,741 A | 7/1995 | Crandall ....................... 359/15 |
| 5,481,409 A | 1/1996 | Roberts ....................... 359/839 |
| 5,497,305 A | 3/1996 | Pastrick et al. ............. 362/464 |
| 5,788,357 A | 8/1998 | Muth et al. .................. 362/494 |
| 5,984,496 A | * 11/1999 | Malcomson ................. 362/494 |
| 6,005,724 A | 12/1999 | Todd ........................... 359/884 |
| 6,045,243 A | 4/2000 | Muth et al. .................. 362/494 |
| 6,257,746 B1 | 7/2001 | Todd et al. .................. 362/494 |
| 6,276,821 B1 | 8/2001 | Pastrick et al. |
| 6,585,399 B2 | * 7/2003 | Kreutzer et al. ............ 362/341 |

FOREIGN PATENT DOCUMENTS

| | | |
|---|---|---|
| GB | 268359 | 7/1927 |
| GB | 1172382 | 11/1969 |

* cited by examiner

Primary Examiner—Thomas M. Sember
Assistant Examiner—Ismael Negron
(74) Attorney, Agent, or Firm—Wells St. John P.S.

(57) ABSTRACT

A signaling assembly having a reflective substrate with opposite first and second surfaces, and wherein each of the surfaces simultaneously reflects visibly discernable electromagnetic radiation and passes electromagnetic radiation; and an emitter for emitting visibly discernable electromagnetic radiation is provided, and wherein the emitted visibly discernable electromagnetic radiation may be simultaneously viewed from locations forward of the opposite first and second surfaces of the reflective substrate.

20 Claims, 6 Drawing Sheets

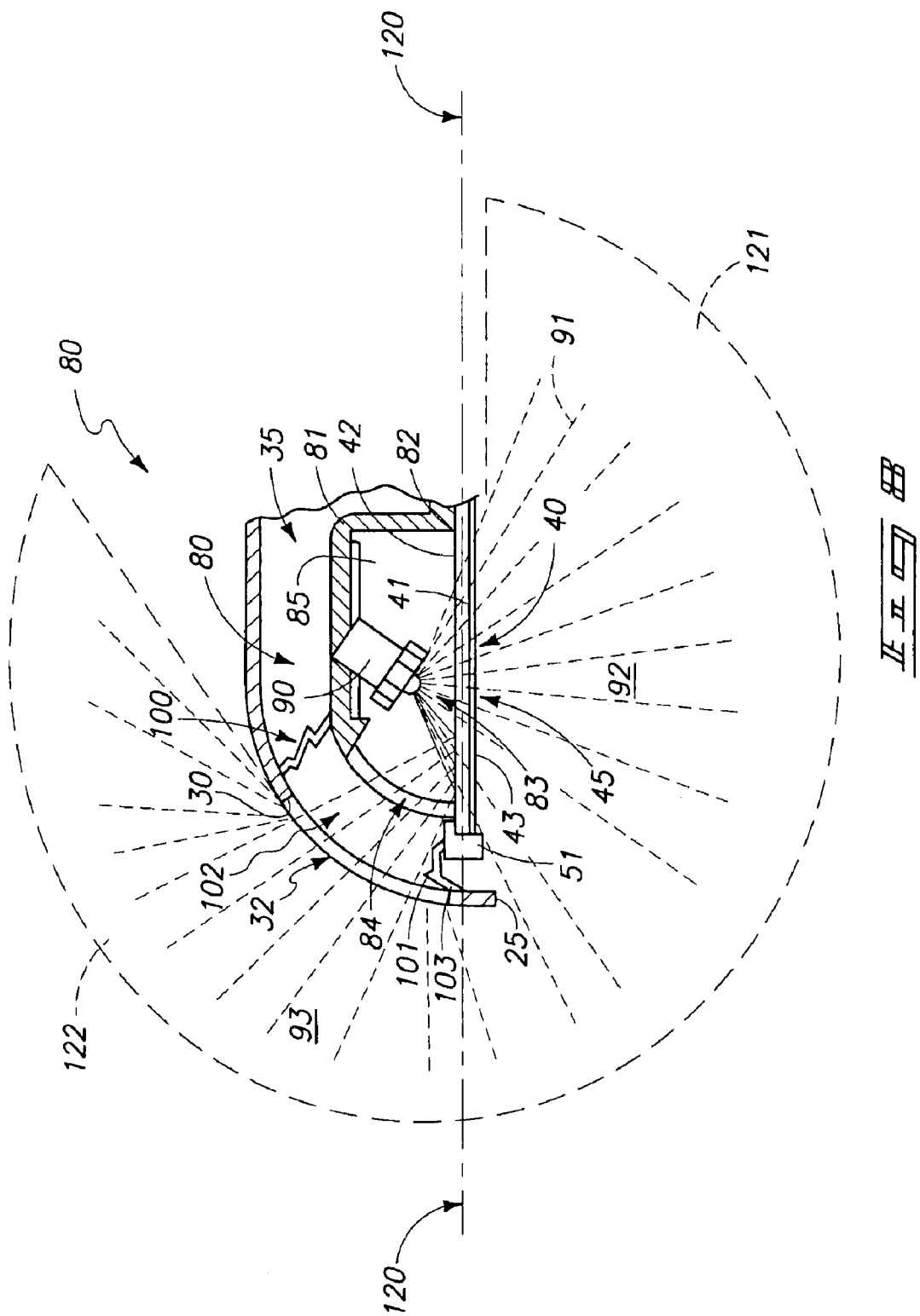

MIRROR WITH INTEGRATED SIGNALING ASSEMBLY

TECHNICAL FIELD

The present invention relates to a signaling assembly which finds usefulness when installed on overland vehicles, and more particularly to a signaling assembly which when coupled with the controls of an overland vehicle may operate as a combined warning lamp and rear view mirror assembly, and which further provides a visibly discernible signal which can be viewed from a wide range of locations not possible heretofore.

BACKGROUND OF THE INVENTION

The beneficial effects of employing auxiliary signaling assemblies have been disclosed in various U.S. patents including U.S. Pat. Nos. 5,014,167; 5,207,492; 5,355,284; 5,361,190; 5,481,409; 5,528,422; 6,005,724; and 6,257,746 all of which are incorporated by reference herein. The mirror assemblies disclosed in some of these patents teach the use of various dichroic mirrors which are operable to reflect a broad band electromagnetic radiation, within the visible light portion of the spectrum, while simultaneously permitting electromagnetic radiation having wavelengths which reside within a predetermined spectral band to pass therethrough. As disclosed in this earlier prior art, these same dichroic mirrors remain an excellent visual image reflector, that is, achieving luminous reflectance which is acceptable for automotive, and other industrial applications, while simultaneously achieving an average transmittance in the predetermined spectral band which is suitable for use as a visual signal at a wide range of distances and for various purposes.

While all of these prior art devices have worked with some degree of success, various shortcomings have been uncovered which have detracted from their wide spread use. Among the several shortcomings which have impeded commercial introduction has been the manufacturing costs associated with applying the rather complex optical coatings which are necessary to form the dichroic mirrors that are employed in these devices.

Still further, other devices have been introduced which diverge, to some degree, from the use of dichroic mirrors. These devices however, when built in accordance with their teachings, have been unable to provide the same performance characteristics as provided by the prior art which employs dichroic mirrors. Still further, other prior art references have described devices which attempt to provide the same functional benefits as described in these earlier patents. These references describe all manner of mirror housing modifications, where for example, lamps are located in various orientations to project light into predetermined areas both internally and/or beside the overland vehicle and to further provide auxiliary signaling or warning capability. Examples of these patents include U.S. Pat. Nos. 4,583,155; 4,646,210; 4,916,430; 5,059,015; 5,303,130; 5,371,659; 5,402,103; 5,497,306; and 5,436,741 to name but a few.

In addition to the shortcomings associated with fabricating a suitable dichroic coating for use in mirror assemblies as described in the prior art, the associated mirror housings have decreased in volume as a result of recent automotive platform design changes. Consequently, the amount of internal space which is available when these same housings are employed is quite limited. Therefore, the size and weight of an enclosed light emitting assembly employed in such signaling devices has become a significant factor in the development and commercial introduction of a suitable product.

To address these and other perceived shortcomings in the prior art, U.S. Pat. No. 6,005,724 disclosed a novel mirror assembly which employed a mirror substrate which is fabricated by using conventional techniques, and which includes a primary mirror surface region which reflects less than about 80% of a given band of visibly discernable electromagnetic radiation; and a secondary region adjacent thereto and through which electromagnetic radiation may pass. In this arrangement, the secondary region reflects at least about 35% of the same given band visibly discernable electromagnetic radiation. In mirrors of this design, the average reflection of the mirror coating is greater than about 50%. This novel invention resulted in dramatic decreases in the manufacturing costs for devices of this type. Still further, the perceived safety advantages of using such auxiliary signaling devices has now been well established, inasmuch as these same signaling assemblies provide a convenient means whereby an operator may signal vehicles which are adjacent to, and rearwardly oriented relative to an overland vehicle equipped with same, of their intention, for example, to change lanes, turn, or perform other vehicle maneuvers which would be of interest to vehicles traveling adjacent to thereto.

A signaling assembly which achieves these and other advantages is the subject matter of the present application.

SUMMARY OF THE INVENTION

Therefore, one aspect of the present invention is to provide a signaling assembly which includes a reflective substrate having opposite first and second surfaces, and wherein each of the surfaces simultaneously reflects visibly discernable electromagnetic radiation, and passes electromagnetic radiation; and an emitter is provided for emitting visibly discernable electromagnetic radiation which is simultaneously reflected in part, and passed in part, by the reflective substrate, and wherein the emitted visibly discernable electromagnetic radiation may be simultaneously viewed from locations forward of the opposite, first and second surfaces.

Another aspect of the present invention relates to a signaling assembly which includes a reflective substrate having first and second surfaces, and which each reflect, and pass, visibly discernable electromagnetic radiation; and an electromagnetic radiation emitter is provided and which is positioned adjacent to the second surface, and which emits a visibly discernable electromagnetic radiation having a first portion which is passed by the reflective substrate, and which may be visibly discerned when viewed from a location substantially forward of the first surface; and a second portion which is reflected from the reflective substrate, and which may be visibly discerned when viewed from a location substantially forward of the second surface.

Still further, another aspect of the present invention relates to a signaling assembly which includes a reflective substrate which reflects and passes electromagnetic radiation; and an electromagnetic radiation emitter is provided and which, when energized, emits electromagnetic radiation which is directed toward the reflective substrate, and wherein a first portion of the electromagnetic radiation is passed by the reflective substrate and may be viewed by an observer from a first location relative to the reflective substrate, and a second portion of the electromagnetic radiation is reflected by the reflective substrate and may be viewed by an observer from a second location.

Yet still another aspect of the present invention relates to a signaling assembly which includes a reflective substrate having opposite first and second surfaces, and wherein each of the first and second surfaces reflect and pass electromagnetic radiation, and wherein a portion of the reflective substrate passes less than about 4% of ambient visible electromagnetic radiation, and wherein the average reflectance of the first surface is greater than about 35%, and wherein the reflective substrate generally defines a major line of reference; and a light emitting device is positioned adjacent to the second surface and which, when energized, emits a visibly discernable electromagnetic radiation which is directed toward the second surface, and wherein the visibly discernable electromagnetic radiation includes a first portion which passes through the reflective substrate and which may be substantially visibly discerned from locations within about 180 degrees relative to the line of reference, and forward of the first surface, and wherein the visibly discernable electromagnetic radiation emitted by the light emitting device has a second portion which is reflected from the reflective substrate, and which may be visibly discerned from locations greater than about 180 degrees relative to the line of reference, and from a position forward of the second surface.

A further aspect of the present invention relates to a signaling assembly which includes a housing having opposite first and second sides, and which has a cavity, and which further defines first and second apertures; a reflective substrate having opposite first and second surfaces and which is disposed in substantially occluding relation relative to the first aperture; and an emitter is provided and which is located within the cavity, and which when energized emits visibly discernable electromagnetic radiation which is bifurcated to provide viewing of the visibly discernable electromagnetic radiation from the opposite sides of the housing.

Still another aspect of the present invention relates to a signaling assembly for use on an overland vehicle which has a forward and rearward end, and which includes a housing mounted on the overland vehicle, and wherein the housing includes an opaque sidewall which defines an internal cavity, and which further defines a first and second aperture; a reflective substrate is provided and which has opposite first and second surfaces, and wherein each of the first and second surfaces reflects and passes visibly discernable electromagnetic radiation, and wherein the reflective substrate substantially occludes the first aperture, and wherein the first surface thereof faces away from the cavity, and can be viewed from locations laterally and rearwardly disposed relative to the overland vehicle, and the second surface thereof faces inwardly towards the cavity; a translucent substrate is positioned in substantially occluding relation relative to the second aperture, and wherein the translucent substrate can be viewed from locations which are laterally and forwardly disposed relative to the overland vehicle; and an electromagnetic radiation emitter is provided and which is positioned in the cavity, and which, when energized, emits electromagnetic radiation which has a first portion which is passed by the first and second surfaces of the reflective substrate, and which forms a first, visibly discernable signal which can be viewed from locations which are laterally and rearwardly disposed relative to the overland vehicle, and a second portion which is reflected by the first and second surfaces, and which passes through the translucent substrate which is positioned in substantially occluding relation relative to the second aperture, and which forms a second visibly discernable signal which can be viewed from locations which are laterally and forwardly disposed relative to the overland vehicle.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 8 is a greatly simplified, fragmentary, longitudinal, vertical sectional view taken from a position which is generally along line 7—7 of FIG. 6 and which illustrates the illumination pattern of the visibly discernable electromagnetic radiation which is emitted by the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
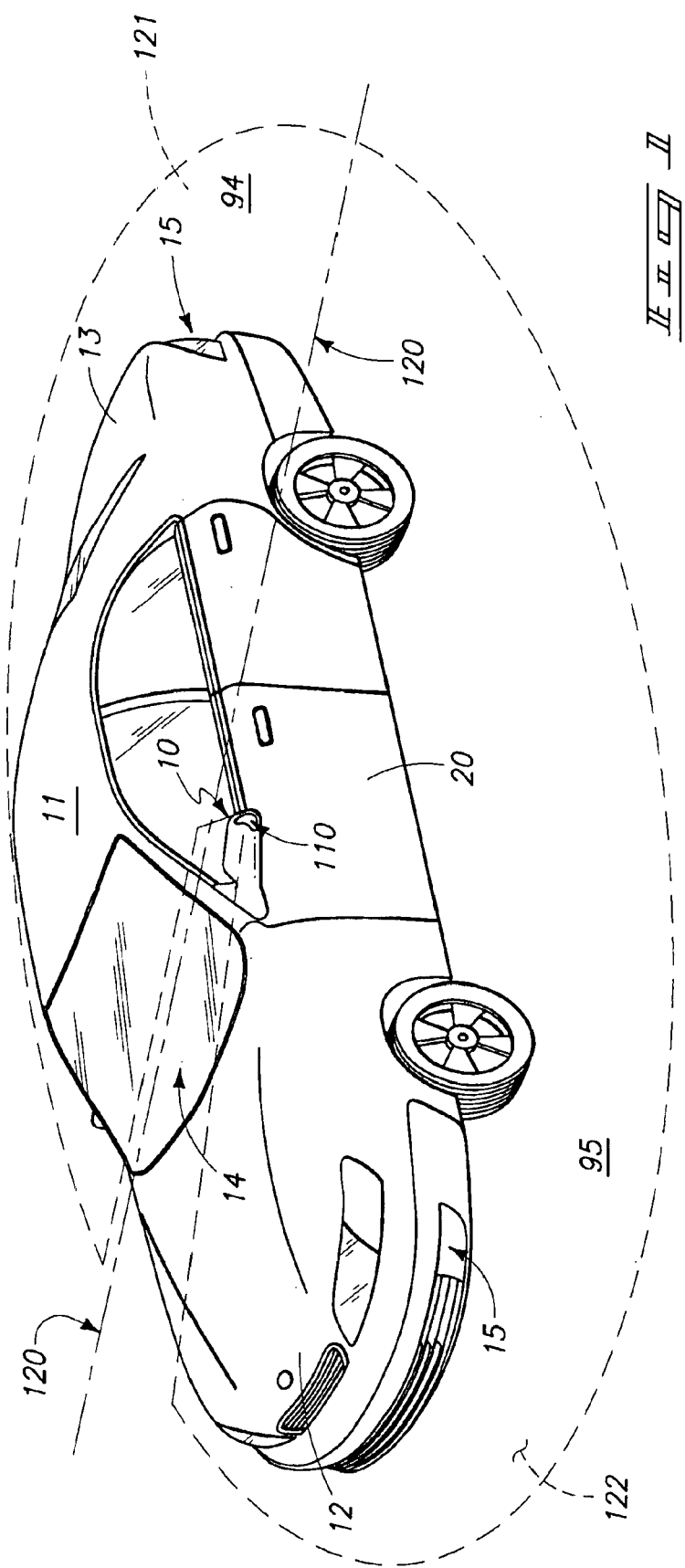
FIG. 1 is a perspective view of an overland vehicle which employs the signaling assembly of the present invention.
Figure 2:
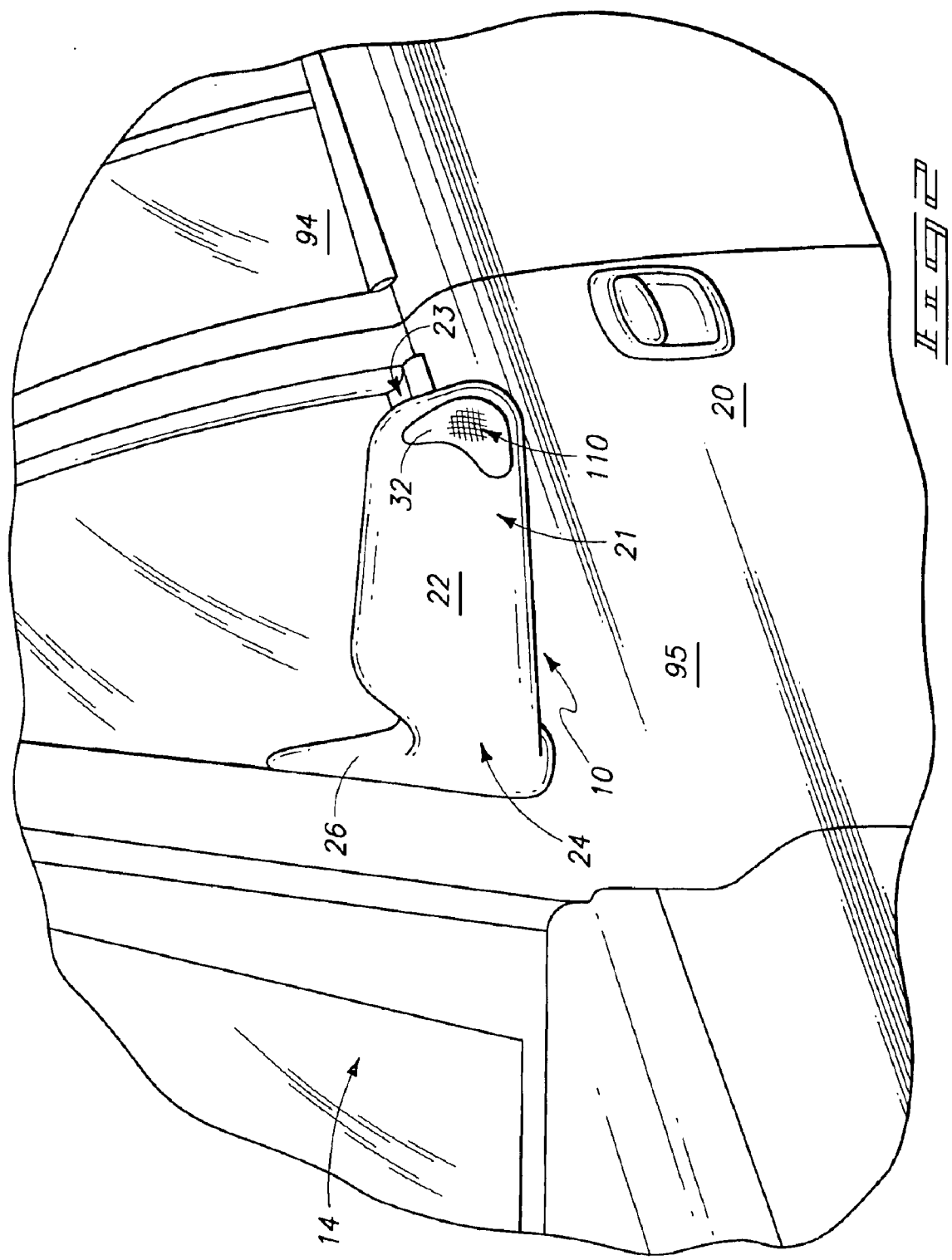
FIG. 2 is a perspective, somewhat enlarged view of the signaling assembly of the present invention, and which is appropriately mounted on an overland vehicle.
Figure 3:
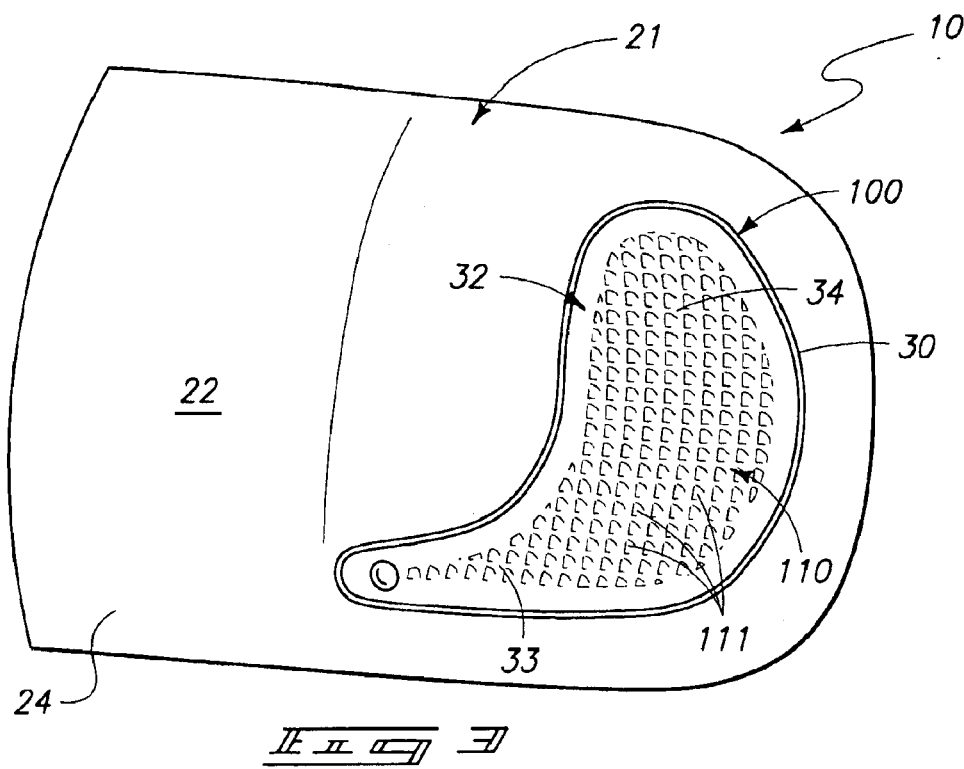
FIG. 3 is a perspective, side elevation view of a signaling assembly of the present invention.
Figure 4:
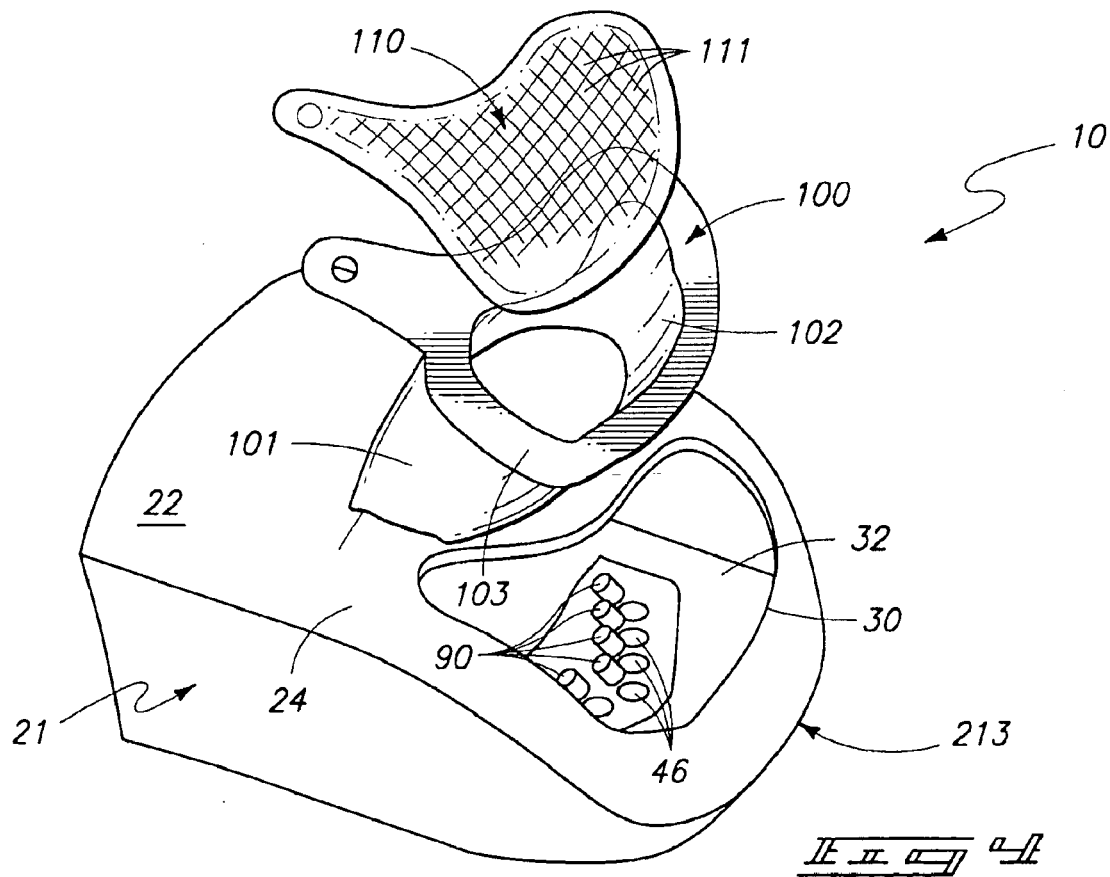
FIG. 4 is a perspective, exploded view of a signaling assembly of the present invention with some supporting surfaces removed to show the structure thereunder.
Figure 5:
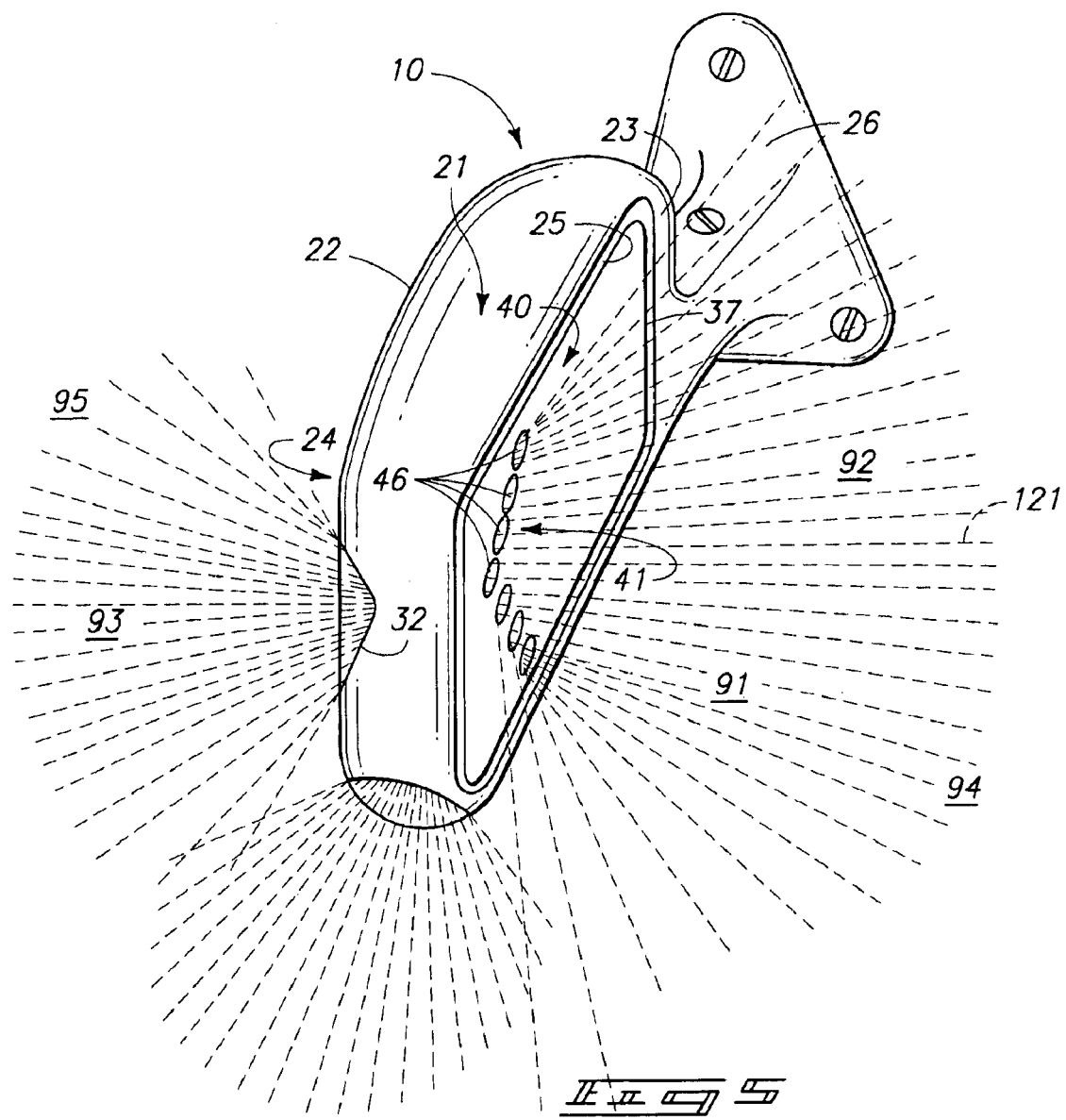
FIG. 5 is a perspective view of an energized signaling assembly of the present invention.
Figure 6:
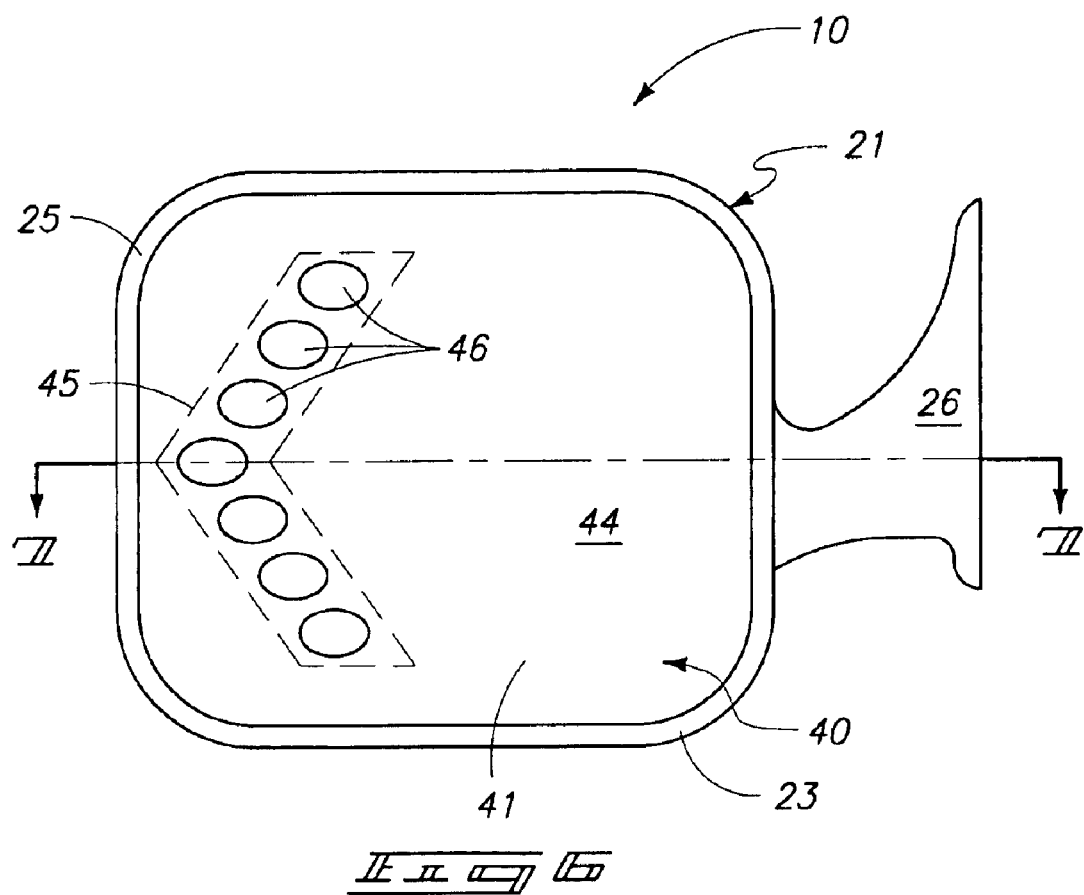
FIG. 6 is a second, side elevation view of a signaling assembly of the present invention.
Figure 7:
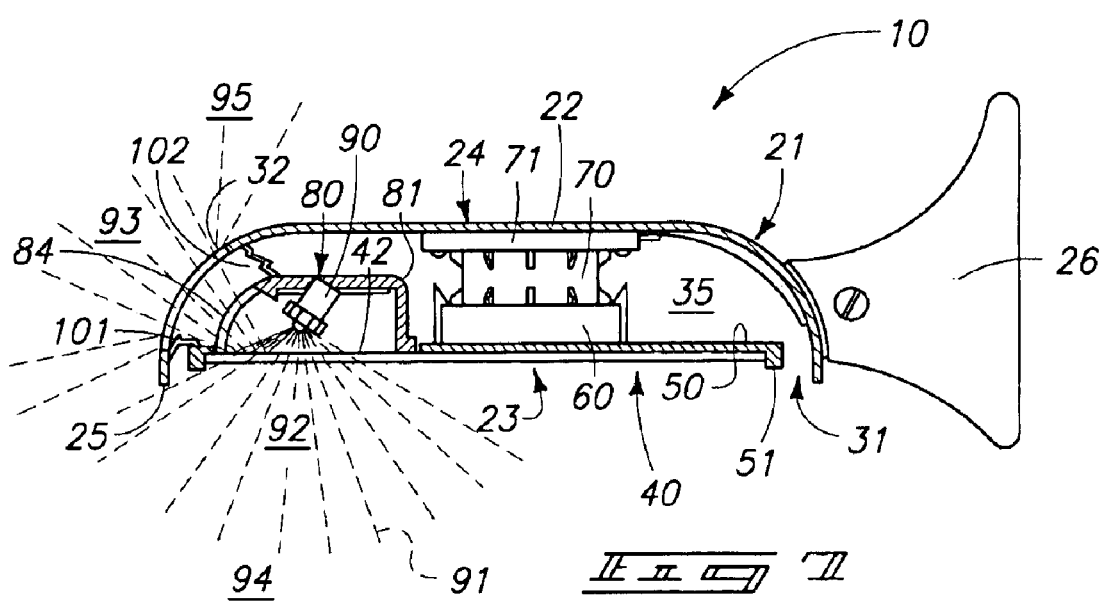
FIG. 7 is a transverse, vertical, sectional view of the present invention and which is taken from a position along line 7—7 of FIG. 6.

A signaling assembly which incorporates the teachings of the present invention is best seen by reference to the numeral 10 in FIGS. 1–8 respectively. As discussed above, the present invention finds usefulness when installed on an overland vehicle 11 of conventional design and which is best seen by reference to FIG. 1. As shown therein, the overland vehicle 11 has a forward, or front end 12; an opposite, or rear end 13; and an operators position 14. From the operators position 14, various signaling lamps indicated by the numeral 15 can be selectively energized in order to provide visual information to adjoining drivers regarding the intended directional movement of the overland vehicle 11 as it proceeds along a given course of travel. As seen more specifically by reference to FIG. 2, the apparatus 10 is mounted on the door 20 of the overland vehicle such that a portion, or one side of same (FIG. 6) can be viewed from the operators position 14. As seen more specifically in FIGS. 3 through 8, the apparatus 10 includes a housing generally indicated by the numeral 21. The housing 21 is formed of a substantially continuous, opaque, convexly curved sidewall 22. The convexly curved sidewall has a first side 23, and an opposite, second side designated by the numeral 24. As seen in FIG. 5, for example, the continuous sidewall 22 is defined by a first peripheral edge 25 which is located on the first side 23 of the housing. Further, the convexly curved sidewall 22 has a second peripheral edge 30 (FIG. 4), which is located on the second side 24 of the housing 23. As illustrated, the first peripheral edge 25 is located in generally about the same plane, and defines a first aperture 31 (FIG. 7). Yet further, the second peripheral edge 30, defines a second aperture 32 which follows the curvature or shape of the sidewall 22. As a result, the second peripheral edge 30, which defines the second aperture 32, does not lie in substantially the same plane as is the case with the peripheral edge 25 which defines the first aperture 25. This aspect of the invention can be seen by references to FIGS. 4 and 5, for example. The second aperture 32 has first and second diverging portions 33 and 34 (FIG. 3). The housing 21 defines a cavity 35 which encloses various assemblies which will be discussed in greater detail hereinafter.

As seen most clearly by reference to FIGS. 6, 7 and 8, a mirror 40, of substantially conventional design, is received in substantially occluding relation relative to the first aperture 31. The mirror 40 has a first outwardly facing surface 41; and a second, inwardly facing surface 42. As seen most clearly by reference to the greatly simplified and exaggerated view of FIG. 8, a mirror coating which is generally designated by the numeral 43 is deposited on the first surface 41 and provides a highly reflective surface which reflects ambient visibly discernible electromagnetic radiation. Still further, and as seen by reference to FIG. 6, the mirror 40 has a primary region 44 which is substantially continuous, and which reflects at least about on average about 35% of all ambient visibly discernable electromagnetic radiation, and which originates from diverse locations, and which permits an operator seated in the operators position 14 to view rearwardly and laterally of the overland vehicle 11. Additionally, the mirror 40 has a secondary region 45 which is adjacent to the primary region and which is generally defined by a plurality of light emitting apertures 46. The secondary region is shown by means of the phantom line as illustrated in FIG. 6. Light emitting apertures 46 are formed in the secondary region by removing a portion of the mirror coating 43 in a given pattern. The secondary region 45 permits at least about 5% of visibly discernable electromagnetic radiation to pass therethrough. As seen in the drawings, the secondary region may be continuous or discontinuous. The specific details of forming the primary and secondary regions 44 and 45 are set forth in detail in U.S. Pat. No. 6,005,724 the teachings of which are incorporated by reference herein.

As seen in FIGS. 6 and 7, the mirror 40 is secured in substantially occluding relation relative to the first aperture 31 by means of a mirror bezel which is designated by the numeral 50. The mirror bezel includes a circumscribing edge 51 which frictionally engages the mirror 40 and secures it thereto. A motor engagement member or puck 60 is affixed to the mirror bezel 50. The motor puck 60 is acted upon by a motor 70 of conventional design. The motor is controlled from the operators position 14. The motor allows the operator to appropriately position the mirror 40 in various positions relative to the operators position 14 such that the operator can view various areas of interest which are adjacent, rearwardly and laterally oriented relative to the overland vehicle 11. The motor 70 is attached to the housing 21 by means of a motor mount 71 of conventional design.

A light orientation assembly which is designated by the numeral 80 is received within the cavity 35. The light orientation assembly includes an enclosure 81 which is juxtaposed relative to the second inwardly facing surface 42 of the mirror 40. The enclosure 81 is defined by a peripheral edge 82. When positioned adjacent to the second surface of the mirror, the enclosure 81 defines first and second areas or regions 83 and 84, respectively through which visibly discernable electromagnetic radiation may pass. Yet further, the enclosure 81 defines a second cavity 85.

As seen by reference to FIGS. 7, and 8, a visibly discernable electromagnetic radiation emitter of conventional design 90 is received within the cavity 85 which is defined by the enclosure 81. The emitter 90 is obliquely disposed relative to the second inwardly facing surface 42 of the mirror 40. The electromagnetic radiation emitter 90, when energized, emits visibly discernable electromagnetic radiation 91 which is bifurcated, and which is passed in part, and reflected in part by the mirror 40. In this regard, the electromagnetic radiation 91 includes a first portion 92 which is passed by the mirror 40, and which comprises about 30% to about 95% of the emitted electromagnetic radiation. Still further, the second portion which is reflected by the mirror 40 comprises about 5% to about 70% of the emitted electromagnetic radiation. As best seen by reference to FIG. 7, the first and second portions of the electromagnetic radiation move outwardly through the respective first and second apertures 31 and 32 defined by the housing 21 such that the first portion 92 can be seen from a first position 94 which is located forwardly of the first surface of the mirror 40, and the second portion 93 can be seen from a second position 95 which is located forward of the second surface 42.

As seen in FIGS. 4, and 8, the apparatus 10 of the subject invention includes a light conducting enclosure, conduit or boot which is generally designated by the numeral 100. As seen in the various sectional views, the light directing enclosure 100 is defined by a flexible, opaque and resilient sidewall and which is generally indicated by the numeral 101. The sidewall defines a passage 102 which extends from a position adjacent to the second area or region 84 which is defined by the light orientation assembly 80 and which permits visibly discernable electromagnetic radiation generated by the emitter 90 to escape the enclosure 81. As illustrated, the sidewall 101 includes a distal peripheral edge 103 which can form a weatherproof seal against the sidewall 22. As seen in FIG. 8, the light conducting enclosure, in one form of the invention, is affixed to the light orientation assembly 80 and provides a vibrational dampening means for the apparatus 10, and more specifically the mirror 40. Yet further, the opaque sidewall 101 prevents any significant amount of emitted visibly discernable electromagnetic radiation 91 from escaping into the cavity 35 and generally directs the emitted electromagnetic radiation comprising the second portion thereof 93 through the second aperture 32.

Additionally in another form of the invention, the light conducting enclosure is fabricated from a material which has a light absorbing yet highly reflective, and/or glossy finish, and which operates as reflector, as well as a vibration dampening device. Moreover, this same type of surface coloration and texture also functions to provide a darkened background color for the adjacent translucent substrate 110 which occludes the second aperture 32. This darkened background color increases the apparent relative contrast of the second portion 93 of the emitted electromagnetic radiation 91 against the ambient light levels from the environment when the apparatus 10 is energized.

As seen most clearly by reference to FIG. 3, 4 and 5, the second aperture 32 is substantially occluded by a translucent substrate which is designated by the numeral 110. The translucent substrate 110 permits the electromagnetic radiation 91, and more specifically the second portion 93 to pass therethrough and be viewed from positions which are forward of the second surface 42. The translucent substrate 110 is formed by conventional manufacturing techniques. As seen in FIGS. 3 and 4, a plurality of lenses of various types 111 are made integral with the translucent substrate 110 and provide a means to effectively disperse the visibly discernable electromagnetic radiation 93 in a wide pattern. In this regard and referring now to FIGS. 5 and 8, it will be seen that the mirror 40 defines a line of reference which is generally indicated by the numeral 120. Relative to this line of reference, the first portion 92 of the electromagnetic radiation 91 emitted by the electromagnetic radiation emitter 90 forms a first zone of light 121 which can be viewed from a location laterally and rearwardly of the overland vehicle 11. This first zone of light constitutes a first visibly discernable signal. This first zone of light 12, lies within, and less than about, 180 degrees relative to the line of reference. Still further, the second portion of the electromagnetic radiation 93 which is emitted, and which passes out through the second aperture 32, and through the translucent substrate 110 may be substantially visibly discerned from locations which are laterally and forwardly disposed relative to the overland vehicle 11, and within, about, greater than 180 degrees relative to the line of reference. This second portion of the light 93 forms a second zone of light 122 and a second visibly discernable signal. As can be seen by references to FIGS. 1 and 8, the electromagnetic radiation 91 provided by the apparatus 10 is therefore substantially visible from assorted positions which are located at less than about 300 degrees relative to the line of reference.

OPERATION

The operation of the described invention 10 is believed to be readily apparent and is briefly summarized at this point.

As best seen by the enclosed drawings, a signaling assembly 10 of the present invention includes a mirror or reflective substrate 40 having opposite first and second surfaces 41 and 42, and wherein each of the surfaces simultaneously reflects visibly discernable electromagnetic radiation and passes electromagnetic radiation; and an emitter 90 is provided for emitting visibly discernable electromagnetic radiation 91 which is simultaneously reflected in part 93, and passed in part 92, by the reflective substrate 40. As seen, the emitted electromagnetic radiation 91 may be simultaneously viewed from locations 94 and 95 which are forward of the opposite first and second surfaces 41 and 42. The signaling assembly of the present invention 10 further includes a housing 21 having a sidewall 22, and which defines a cavity 35. The sidewall 22 further defines first and second apertures 31 and 32, and wherein the reflective substrate 40 substantially occludes the first aperture. A translucent substrate 110 is provided, and which is positioned in substantially occluding relation relative to the second aperture 32. As illustrated, the electromagnetic radiation emitter 90 emits electromagnetic radiation 91 which has a first portion 92 which is passed by the reflective substrate 40 and which can be seen from a location forward 94 of the first surface 41; and a second portion 93 which can be seen from a position 95 which is forward of the second surface 42. The first portion 92 of the electromagnetic radiation 91 comprises about 30% to about 95% of the electromagnetic radiation 91; and the second portion 93 of the electromagnetic radiation 91 is about 5% to about 70% of same. As was discussed above, the electromagnetic radiation 91 and more particularly the first portion 92 thereof can be seen from a position within about 180 degrees relative to the line of reference 120 which is defined generally by the mirror or reflective substrate 40. Yet further, the electromagnetic radiation 91 forming the second portion 93 thereof can be seen from locations greater than about 180 degrees relative to the same line of reference 120. As seen by reference to FIG. 1, for example, the electromagnetic radiation 91 can be seen from various positions which are located generally within about less than about 300 degrees relative to the line of reference 120.

Therefore the present invention provides a signal assembly 10 for use on an overland vehicle 11 which has a forward or front end 12 and an opposite rear end 13, and which includes a housing 21 mounted on the overland vehicle and which has an opaque sidewall 22 which defines an internal cavity 35. Further, the sidewall 22 defines first and second apertures 31 and 32, respectively. A reflective substrate 40 having opposite first and second surfaces 41 and 42 is provided. Each of the respective surfaces reflects and passes visibly discernable electromagnetic radiation 91. The reflective substrate 40 substantially occludes the first aperture 31. The first surface thereof 41 faces away from the cavity 35 and can be viewed from locations 94 which are laterally and rearwardly disposed relative to the overland vehicle 11. Further, the second surface 42 faces inwardly towards the cavity 35. A translucent substrate 110 is positioned in substantially occluding relation relative to the second aperture 32. The translucent substrate can be viewed from locations 95 which are laterally and forwardly disposed relative to the overland vehicle 11. An electromagnetic radiation emitter 90 is provided and which is positioned in the cavity 35 and which, when energized, emits electromagnetic radiation 91 which has a first portion 92 which is passed by the first and second surfaces 41 and 42 of the reflective substrate 40. This first portion 92 forms a first zone of light, or visibly discernable signal 121 which can be viewed from a position 94 which is laterally and rearwardly disposed relative to the overland vehicle 11. Still further, the second portion 93 is reflected by the first and second surfaces 41 and 42, and passes through the translucent substrate 110 and forms a second zone of light or visibly discernable signal 122 which can be viewed from various locations 95 which are laterally and forwardly disposed relative to the overland vehicle 11.

As presently disclosed, the apparatus 10 includes a light enclosure or conduit 100 which defines a passageway 102 between the second surface 42 of the reflective substrate 40 and the second aperture 32. The light conduit is operable in one form of the invention to dampen vibrations which are transmitted to the reflective substrate 40 by means of the operation of the overland vehicle 11. In addition to the foregoing, the translucent substrate 110 passes visibly discernable electromagnetic radiation which originates from locations laterally and forwardly disposed relative to the overland vehicle 11. This same visibly discernable electromagnetic radiation which originates from other locations is passed by the reflective substrate 40 and can be viewed from the operators position 14.

Therefore it will be seen that the signaling assembly 10 of the present invention provides a convenient means by which the shortcomings of the prior art devices or assemblies can be readily rectified and which further provides a signaling assembly which achieves further benefits by providing a visible signal which can be seen through a wide range of locations relative to the overland vehicle and not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A signaling assembly, comprising:
   a reflective substrate having opposite first and second surfaces, and wherein each of the surfaces simultaneously reflects, visibly discernable electromagnetic radiation, and passes electromagnetic radiation; and
   an emitter borne by the second surface of the reflective substrate and which emits visibly discernable electromagnetic radiation which is simultaneously reflected in part, and passed in part, by the reflective substrate, and wherein the emitter is disposed in an oblique orientation relative to the second surface of the reflective substrate, and wherein the emitted visibly discernable electromagnetic radiation may be simultaneously viewed from locations forward of the opposite first and second surfaces of the reflective substrate.

2. A signaling assembly as claimed in claim 1, and further comprising:
   a housing defining an internal cavity, and further having an aperture, and wherein the emitter is received in the cavity, and wherein the reflective substrate substantially occludes the aperture, and the second surface of the reflective substrate faces in the direction of the cavity.

3. A signaling assembly as claimed in claim 1, and wherein the reflective substrate has a primary region which reflects on average at least about 35% of all visibly discernable electromagnetic radiation, and a secondary region which passes at least about 5% of the same visibly discernable electromagnetic radiation.

4. A signaling assembly as claimed in claim 1, and further comprising:
   a housing having a sidewall and which defines a cavity, and wherein the sidewall further defines first and second apertures, and wherein the reflective substrate substantially occludes the first aperture; and
   a translucent substrate is positioned in substantially occluding relation relative to the second aperture.

5. A signaling assembly as claimed in claim 1, and wherein about 30% to about 95% of the emitted visibly discernable electromagnetic radiation is passed by the reflective substrate, and about 5% to about 70% of the emitted visibly discernable electromagnetic radiation is reflected by the reflective substrate.

6. A signaling assembly as claimed in claim 1, and wherein an enclosure is borne by the second surface of the reflective substrate and the emitter is mounted on the enclosure and is obliquely disposed relative to the second surface of the reflective substrate, and which further emits electromagnetic radiation which has a first portion which is passed by the reflective substrate and which can be seen from the location forward of the first surface of the reflective substrate, and a second portion which is reflected from the second surface of the reflective substrate and which can be seen from the location forward of the second surface of the reflective substrate.

7. A signaling assembly as claimed in claim 6, and wherein the first portion of the electromagnetic radiation is about 30% to about 95% of the emitted electromagnetic radiation, and the second portion of the electromagnetic radiation is about 5% to about 70% of the emitted electromagnetic radiation.

8. A signaling assembly, comprising:
   a reflective substrate having opposite first and second surfaces, and wherein each of the first and second surfaces reflect and pass electromagnetic radiation, and wherein a portion of the reflective substrate passes less than about 4% of ambient visible electromagnetic radiation, and wherein the average reflectance of the first surface is greater than about 35%; and
   a light emitting device borne by the second surface of the reflective substrate and which is positioned in an oblique orientation relative to the second surface and which, when energized, emits visibly discernable electromagnetic radiation which is directed in an oblique orientation toward the second surface of the reflective substrate, and wherein the visibly discernable electromagnetic radiation includes a first portion which passes through the reflective substrate, and which may be substantially visibly discerned from locations forward of the first surface, and wherein the visibly discernable electromagnetic radiation emitted by the light emitting device has a second portion which is reflected from the reflective substrate, and which may be visibly discerned from locations forward of the second surface.

9. A signaling assembly comprising:
   a housing having opposite first and second sides and which has a cavity, and which further defines first and second apertures;
   a reflective substrate having opposite first and second surfaces, and which is disposed in substantially occluding relation relative to the first aperture; and
   an emitter located within the cavity, and which is disposed in an oblique orientation relative to the second surface of the mirror, and which when energized, emits visibly discernable electromagnetic radiation which is bifurcated to provide visibly discernable electromagnetic radiation which may be viewed from the opposite sides of the housing.

10. A signaling assembly as claimed in claim 9, and wherein the emitted visibly discernable electromagnetic radiation has a first portion which is passed by the reflective substrate and which can be viewed from the first side of the housing; and a second portion which is reflected from the reflective substrate and which passes through the second aperture such that it may be viewed from the second side of the housing.

11. A signaling assembly for use on an overland vehicle which has a forward and rearward end, comprising:
   a housing mounted on the overland vehicle, and which has an opaque wall which defines an internal cavity and which further defines a first and second aperture;
   a moveable reflective substrate having opposite first and second surfaces, each of which reflects and passes visibly discernable electromagnetic radiation, and wherein the reflective substrate substantially occludes the first aperture, and wherein the first surface thereof faces away from the cavity, and can be viewed from locations laterally and rearwardly disposed relative to the overland vehicle, and the second surface thereof faces inwardly toward the cavity;
   a translucent substrate positioned in substantially occluding relation relative to the second aperture, and wherein the translucent substrate can be viewed from locations laterally and forwardly disposed relative to the overland vehicle;
   an enclosure borne by the second surface of the mirror and which defines first and second regions through which visibly discernable electromagnetic radiation may pass; and
   an electromagnetic radiation emitter positioned in the cavity and which is located within the enclosure, and which is disposed in an oblique orientation relative to the second surface of the reflective substrate and which, when energized, emits electromagntic radiation which has a first portion which escapes from the enclosure by passing through the first region of the enclosure, and is then further passed by the first and second surfaces of the reflective substrate, and which forms a first visibly discernable signal which can be viewed from locations laterally and rearwardly disposed relative to the overland vehicle, and a second portion, which is reflected by the first and second surfaces of the reflective substrate and which escapes from the enclosure by passing through the second region of the enclosure, and which then further passes through the translucent substrate positioned in substantially occluding relation relative to the second aperture, and which forms a second visibly discernable signal which can be viewed from locations laterally and forwardly disposed relative to the overland vehicle.

12. A signaling assembly as claimed in claim 11, wherein the first and second visibly discernible signals are produced substantially simultaneously.

13. A signaling assembly as claimed in claim 11, and further comprising:
    a light conduit positioned within the cavity and which defines a passageway between the second surface of the reflective substrate and the second aperture, and which substantially directs the emitted electromagnetic radiation forming the second signal to the second aperture.

14. A signaling assembly as claimed in claim 11, and wherein the light conduit is resilient, and further has a first end which is mounted adjacent the reflective substrate, and wherein the overland vehicle, during operation generates vibrations which are transmitted to the reflective substrate, and wherein the resilient light conduit operates to dampen the vibrations which are transmitted to the reflective substrate.

15. A signaling assembly as claimed in claim 11, wherein the reflective substrate has a primary region which reflects on average at least about 35% of all visibly discernable electromagnetic radiation, and a secondary region which passes at least about 5% of the same visibly discernable electromagnetic radiation.

16. A signaling assembly as claimed in claim 15, and wherein the first portion of the emitted electromagnetic radiation is about 30% to about 95% of the emitted electromagnetic radiation and the second portion of the emitted electromagnetic radiation is about 5% to about 70% of the emitted electromagnetic radiation.

17. A signaling assembly as claimed in claim 15, and wherein a highly reflective coating is applied to one of the first or second surfaces of the reflective substrate, and wherein a portion of the reflective coating is removed to define the secondary region.

18. A signaling assembly as claimed in claim 17, and wherein the secondary region is continuous.

19. A signaling assembly as claimed in claim 17, and wherein the secondary region is discontinuous.

20. A signaling assembly, comprising:
    a housing having a sidewall, and which defines an internal cavity, and wherein the sidewall further defines first and second apertures;
    a moveable reflective substrate having opposite first and second surfaces, and wherein each of surfaces simultaneously passes and reflects visibly discernable electromagnetic radiation, and wherein the reflective substrate substantially occludes the first aperture defined by the housing, and the second surface of the reflective substrate is received in the internal cavity, and wherein the reflective substrate may be selectively positioned relative to the housing to view an area of interest;
    a translucent substrate positioned in substantially occluding relation relative to the second aperture defined by the housing; and
    an electromagnetic radiation emitter which is borne by second surface of the reflective substrate, and which is further oriented in spaced, oblique electromagnetic radiation emitting relation relative to the second surface of the reflective substrate, and wherein the electromagnetic radiation emitter moves with the reflective substrate as the reflective substrate is selectively positioned relative to the housing, and wherein the electromagnetic radiation emitter, when energized, emits electromagnetic radiation which includes a first portion which is passed by the reflective substrate, and which can be viewed from a position forward of the first surface of the reflective substrate, and a second portion which is reflected from the second surface of the reflective substrate, and which is subsequently passed by the translucent substrate which occludes the second aperture, and wherein the second portion of the emitted electromagnetic radiation can be viewed from a position forward of the second surface of the reflective substrate.

* * * * *